US008142196B2

(12) United States Patent
Zuccolotto et al.

(10) Patent No.: US 8,142,196 B2
(45) Date of Patent: Mar. 27, 2012

(54) PSYCHOLOGY HIERARCHICAL EXPERIMENT SPREADSHEET WITH PRE-RELEASE EVENT TIME SYNCHRONIZATION

(75) Inventors: Anthony P. Zuccolotto, Freeport, PA (US); Leroy Kevin Basler, Irwin, PA (US); Christopher Charles Neff, Pittsburgh, PA (US); Walter Schneider, Pittsburgh, PA (US)

(73) Assignee: Psychology Software Tools, Inc., Pittsburgh, PA (US)

( * ) Notice: Subject to any disclaimer, the term of this patent is extended or adjusted under 35 U.S.C. 154(b) by 1779 days.

(21) Appl. No.: 11/353,862

(22) Filed: Feb. 14, 2006

(65) Prior Publication Data

US 2006/0195780 A1 Aug. 31, 2006

Related U.S. Application Data

(60) Provisional application No. 60/652,822, filed on Feb. 14, 2005.

(51) Int. Cl.
*G09B 19/00* (2006.01)

(52) U.S. Cl. ........ 434/236; 434/322; 434/350; 709/224; 707/609

(58) Field of Classification Search .................. 434/236, 434/238, 322, 350, 365; 707/609; 709/224, 709/238
See application file for complete search history.

(56) References Cited

U.S. PATENT DOCUMENTS

| | | | | |
|---|---|---|---|---|
| 5,255,356 A | * | 10/1993 | Michelman et al. | 715/217 |
| 5,623,591 A | * | 4/1997 | Cseri | 715/762 |
| 5,884,626 A | * | 3/1999 | Kuroda et al. | 600/300 |
| 5,961,332 A | * | 10/1999 | Joao | 434/236 |
| 6,430,574 B1 | * | 8/2002 | Stead | 1/1 |
| 6,529,705 B1 | * | 3/2003 | Keller et al. | 434/362 |
| 6,934,748 B1 | * | 8/2005 | Louviere et al. | 709/224 |
| 7,308,497 B2 | * | 12/2007 | Louviere et al. | 709/224 |
| 2002/0103429 A1 | * | 8/2002 | deCharms | 600/410 |
| 2002/0178185 A1 | * | 11/2002 | Kuchinsky et al. | 707/512 |

OTHER PUBLICATIONS

Media Lab 2004 Research Software User's Guide and Reference, MediaLab, Sep. 26, 2003.*

* cited by examiner

*Primary Examiner* — Kang Hu

(74) *Attorney, Agent, or Firm* — Blynn L. Shideler; Krisanne Shideler; BLK Law Group

(57) ABSTRACT

Creating and executing real-time psychological experiments with sub-millisecond time precision uses a Hierarchical Experiment Spreadsheet (HES) providing a hierarchical data structure and interface. The user adds/modifies experiment levels in a spreadsheet multilevel table representation. New objects and properties are added while maintaining the hierarchical structure of the experiment and prohibiting user corruption of the experiments hierarchical structure. A Time Event Queue Manager (TEQM) provides precision timing using event pre-release synchronization, compensating for timing errors produced by the personal computer operating system and enabling sub-millisecond time precision. Separate microprocessor and embedded software provides an external time base time stamping and event output queuing of events between the subject and host computer; queues and releases host computer stimulus events at future time points; synchronizes host computer clock TEQM clock, displays refresh clocks; and provides an audit of timing precision of all events going to the subject.

12 Claims, 6 Drawing Sheets

FIG. 2

| Trial Specification(Block1): | Variables | Fixation | | Probe | | | | | Feedback | |
|---|---|---|---|---|---|---|---|---|---|---|
| | Congruency | Duration | Text.Text | Duration | Image Filename | KeyInput.Allowable | KeyInput.Correct | Text.Text | Duration | InputObjectName |
| 1 | Congruent | 1000 | + | | horse.bmp | 123 | | horse | 1000 | Probe |
| 2 | Congruent | 1000 | + | | fish.bm | | | fish | 1000 | Probe |
| 3 | Congruent | 1000 | + | | pie.bm | | | pie | 1000 | Probe |
| 4 | Incongruent | 1000 | + | | horse. | | | Pie | 1000 | Probe |
| 5 | Incongruent | 1000 | + | | fish.bm | | | horse | 1000 | Probe |
| 6 | Incongruent | 1000 | + | | pie.bm | | | fish | 1000 | Probe |

Context menu 17:
Cut
Copy
Paste
Delete
Set As Default
Hide Column

Context menu 18:
Add Object
Copy Object
Remove Object
Shift Object Left
Shift Object Right
Properties...

PSYCHOLOGY HIERARCHICAL EXPERIMENT SPREADSHEET WITH PRE-RELEASE EVENT TIME SYNCHRONIZATION

RELATED APPLICATION

The present application claims the benefit of provisional patent application Ser. No. 60/652,822, filed Feb. 14, 2005 and entitled "Psychology Hierarchical Experiment Spreadsheet with Pre-Release Event Time Synchronization."

BACKGROUND INFORMATION

1. Field of the Invention

This invention relates to products, namely software, used in developing and implementing psychological research experiments and assessment of the research for experimental control, wherein the research is experiments involving the presentation of stimuli to humans and collecting responses for the purposes of psychological, behavioral, or human factors assessment.

2. Prior Art

There are known products, generally software, used in creating psychological research experiments and assessment for experimental control. The experiments created involve presenting stimuli to humans and collecting responses for the purposes of psychological, behavioral, or human factors assessment. This software is referred to as "experiment generator" software and is used to specify and run psychological experiments.

In other fields, the superior ease-of-use characteristics of computerized spreadsheets are well-known, especially in the field of office automation. Although the use of computerized spreadsheets is well known, certain computer applications in certain fields have been unable to take full advantage of the spreadsheet metaphor. In the area of psychological research and assessment, a spreadsheet is a familiar interface to researchers since nearly all experimenters analyze data using spreadsheets. However the creation of an experiment is a very different knowledge structure than a set of cells or tables. In order to represent a controlled psychological experiment effectively in a spreadsheet there is a need to provide hierarchical property specification within a spreadsheet interface. The known experiment generator software has failed to adequately provide hierarchical property specification within a spreadsheet interface.

A computerized spreadsheet is, essentially, a system of graphically represented tables and/or a set of expressions within a multi-dimensional grid of cells. Each cell in the spreadsheet grid represents a direct input or parenthetical expression that can, in turn, be a function of some number of other cellular expressions. Each worksheet can provide multiple tables and figures.

Computerized spreadsheets are intended to provide immediate response (i.e. updating of the spreadsheet) to any modifications of the programmed expressions. However, conventional spreadsheets do not provide the controlled hierarchical data structure necessary for efficient description of an experiment. A typical psychological experiment is composed of trials, each of which involves several experimental objects/operators (e.g., presentation of text, graphics, sounds, combinations thereof, or the like) and the collection of responses (key presses, mouse clicks, physiological input signals such as heart rate, etc). The experimental objects are made up of properties (e.g., text, color and font). The experiment itself is composed of sets of trials that make up blocks, and sets of blocks that make up a session (or run). In contrast, the standard spreadsheet is a flat data base without representation of the hierarchical nature of an experiment. The absence of hierarchical representation makes it difficult for the user to specify the experiment, and for the program to provide defaults or to prompt the user for require or recommended specification parameters. There is a need for a hierarchical spreadsheet capable of managing the complexity of such experiments to facilitate specification or designing of the experiment and reviewing/auditing of its performance.

Regarding the specifics of prior art experiment generators, there have been many approaches to experiment generators including script (see Bates & D'Oliveiro, 2003; Dutta, 1995; Eberhardt & Neveroy, 1997; Foster & Foster, 2003; Haussmann, 1992, Hawley, 1991; Hunt, 1994; Kessels & Postma, 1999; Palya & Walter, 1993, 1995; Pallier, & Dupoux, 1997; Pulking, 1996), hypercard (Chute, 1986. Cox & Hulme, et. al., 1992), form based systems (MEL-Schneider, 1989), experiment diagram approaches (PsyScope—Cohen & MacWhinney, 1993), cross linked lists (SuperLab—Haxby, Parasuraman, et al. 1993) and graphical interfaces (E-Prime—Schneider, Eschman, & Zuccolotto, 2002). These approaches fall at various points along a continuum in which power and flexibility are traded-off with speed of learning and ease of use. For example, programming languages provide the greatest power for experiment generation at the greatest cost, whereas list templates provide modest learning time with very limited power. Graphical interfaces provide intermediate power with intermediate effort. Tables of properties have been used in experiment generator software. MEL (Schneider, 1989) and E-Prime (Schneider, Eschman, & Zuccolotto, 2002) which include property lists and table of properties. Empirisoft (see website at http://www.empirisoft.com/medialab/) markets a product that utilizes a table of all the properties of an experiment event. Many of these approaches do a poor job of managing experiment complexity. For example all the properties are shown with no help on each property. Conversely, for a single slide object in E-Prime there are over 120 properties that can be set. For the novice user, having a hundred columns to look through to determine what to set can be daunting. E-Prime provides property pages which provide somewhat of a hierarchy in that there are tables for classes of properties (e.g., display, timing response, sound). However these systems take significant time to learn, typically many hours.

A substantial amount of psychological research requires millisecond or better precision timing of experiments, see Plant, Hammond & Turner 2004. It is very challenging and often impossible to maintain millisecond timing precision for arbitrarily long periods of time with standard Personal Computer (PC) multitasking operating systems such as Microsoft Windows XP® or Macintosh® OS X. These operating systems are non-deterministic by design and are focused on providing efficient use within a business/office environment rather than a time critical research environment. This is a problem because, in order to minimize cost and learning time, researchers seek to use standard desktop computers for psychological research. However, use of such computers can produce timing errors that can be hundreds of milliseconds in length and such operating system timing errors are not easily detected or reported to the experimenter. As the complexity of personal computers increases, timing precision is generally deteriorating with new releases of operating systems. For example, in the Windows® family of operating systems the system arbitrarily deletes active memory pages causing page faults that disrupt timing. Note this is done to better manage available memory across concurrently loaded applications by determining which memory pages may no longer be needed and thus can be temporarily removed/deleted to reduce the system wide 'working set' of memory pages. However, such operating system features produce serious problems of putting short erratic time delays into the execution of the experiment.

Past attempts have been made to use specialized software processes, typically running at high priority, to maintain timing accuracy in PC environments. Many such systems have been published (see Schneider 1972, Plant et. al., 2004). These methods worked well with older operating systems (e.g., DOS) or current generation dedicated or embedded real-time operating systems that directly supported fast short duration threads (QNX Neutrino RTOS http://www.qnx.com/products/rtos/). However the evolution of desktop computers and the extensive use of pre-emptive multitasking operating systems with complex systems for virtual memory and task management have produced computing systems with undependable and non-deterministic timing precision. Techniques, such as using high execution priority, can be used for short durations. However if the user's programs need to access the hard drive, or need a variety of other low level services, timing becomes erratic. For example in Windows®, once a program releases its time slice to the operating system there is no way for the application to predict, and/or forcibly regain execution control in less than a time slice/quantum of the operating system (typically 10 ms). The end result is that the timing is generally good for most applications (e.g., less than 1 ms error but can become very erratic with the program experiencing tens of milliseconds of down time at low frequency (e.g., less than 5% of the time slices). However such timing errors can severely distort the data collected in psychological experiments. The end result is that for experiment processing there is a need to compensate for PC timing and to correct timing errors.

SUMMARY OF THE INVENTION

It is the object of the present invention to address at least some of the aforementioned problems with the prior art in an efficient, cost effective solution. The problems of the prior art are addressed with the Hierarchical Experiment Spreadsheet (HES) according to one aspect of the present invention which provides a hierarchical spreadsheet in which the user adds and modifies levels (e.g., trials, blocks, sessions) and events (e.g., independent variables, slides, feedback, questionnaires, etc.) of an experiment in a spreadsheet multi-level table representation. New objects and properties are added by the software in a manner that maintains the hierarchical structure of the experiment; providing the user help and prompts and prohibiting them from corrupting the hierarchical structure of the experiment. Methods are provided to manage the complexity of the representation of the experiment to speed user data entry and verification of the experiment specification's correctness. Methods provide the experimenter with a visual representation of the events of the experiment to aid conceptualization and debugging. Further, another aspect of the present invention provides precise timing for the implementation of such experiments; a Time Event Queue Manager (TEQM) is provided that uses Pre-Release Event Time Synchronization system. This system includes: A) an external dedicated microprocessor that provides time stamping and event output queuing of events between the subject and host computer; B) a mechanism to have the PC pre-release the output events to TEQM; C) a mechanism to monitor an independent real-time clock with sub-millisecond accuracy to release events at deterministic time points as well as time stamp input data, D) a mechanism to synchronize clocks between the TEQM, host PC computer, and the video system's refresh rate with high precision; and E) a mechanism to provide an audit trail of timing precision of all events being presented to or observed by the subject. An improved method of specifying and creating real-time psychological experiments and executing those experiments with sub-millisecond time precision is thereby provided.

The Hierarchical Experiment Spreadsheet (HES) provides an improved user interface that simplifies, speeds, and enhances experiment development. The Time Event Queue Manager (TEQM) improves the timing precision of experiment stimulus presentation and data collection. Psychology Experimenters run subjects or participants in computerized experiments to assess psychological functioning of the subjects. The innovations described here will enhance the diagnostic effectiveness of psychological research and assessment for instruction, research and clinical diagnosis. These tools will be applied to develop experiment generator software that can be used in thousands of laboratories and to assess hundreds of thousands of humans and aid in the diagnosis, human factors design, and treatment of potentially millions of humans in areas such as memory, aging, and psychological clinical disorders.

The Hierarchical Experiment Spreadsheet (HES) provides a novel spreadsheet system and method of developing and communicating experiments that enables students and researchers with minimal computer knowledge (e.g., rudimentary spreadsheet skills) to learn to create experiments in less than two hours; which is a substantial saving in time relative to existing experiment creation systems such script based systems (see Schneider, Eschman & Zuccolotto). Substantial human factors usability testing has allowed the development of the hierarchical spreadsheet interface that manages the complexity of the experimental specification. The hierarchical spreadsheet uses multiple spreadsheets and column headings to identify the hierarchy. For example the session, block and trial levels of the experiments are different/distinct tables. A sequence of experimental events is illustrated as merged cells of grouped properties of the object. The interface provides a concise representation of an experiment with easy prompts for providing context sensitive help and defaults to aid the user. In user testing the interface provided a dramatic reduction in the time to learn the experiment generator and faster experiment development.

The HES is coupled with special algorithms and hardware to provide precision timing of psychological experiments. As discussed above, a substantial amount of psychological research requires millisecond or better precision timing of experiments. The present invention combines several innovations that can compensate for PC timing errors. The system uses specialized hardware and/or software subroutines to maintain time precision of all input/output events from/to the subject with the external Time Event Queue Manager (TEQM) and maintains its own time independent of the host computer's time. It provides a system and method to pre-queue output events to the subject and to time stamp all events from the subject such that timing precision is robust to the modest timing errors that are typical of PC computer execution.

These and other advantages will become apparent in the description of the preferred embodiments in which like numeral references represent like elements throughout. The illustrated and described embodiments are merely representative of the present invention rather than being restrictive thereof.

BRIEF DESCRIPTION OF THE DRAWINGS

The invention will be more fully understood from the following detailed description, in conjunction with the following figures, wherein:

FIG. 2 is a schematic representation of screenshots of the trial level specification of an experiment within the HES of the present invention, and showing the experiment objects of variables, slides, and feedback as merged sets of columns;

BRIEF DESCRIPTION OF THE PREFERRED EMBODIMENTS

Figure 1:
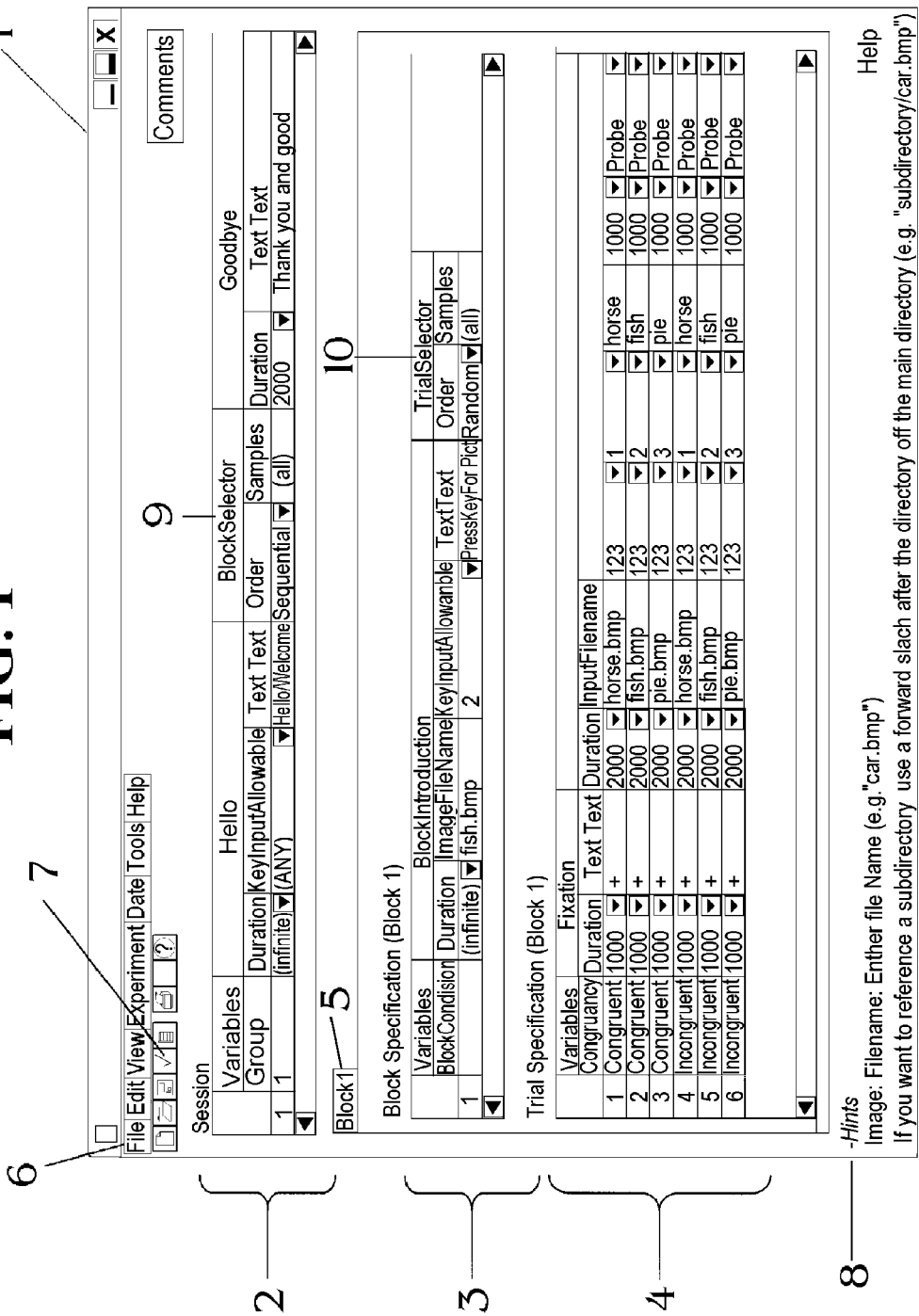
FIG. 1 is a schematic view of the screenshots for a Hierarchical Experiment Spreadsheet (HES) Interface & Experiment Levels according to the present invention.

FIG. 1 illustrates the Hierarchical Experiment Spreadsheet (HES) interface 1 with three levels of specification of the session level 2, block level 3 and trial level 4. The three levels 2, 3 and 4 represent three dependent, interconnected, hierarchal, simultaneously viewable spreadsheets as described below. The block level 3 can contain multiple tabs 5 for different blocks in the block level 3. The interface 1 may contain a menu 6 and process buttons 7 to perform functions and some hint or help system 8 that can provide cell or object context sensitive hints. The session level 2 includes a Block Selector 9 that is used to select the appropriate blocks of the block level 3, thereby interconnecting these levels. A Trial Selector 10 of the block level 3 selects specific trial specifications of trial level 4, interconnecting these levels. The selector objects determine the number/time during which events of the next level occur and the ordering (e.g., fixed, permuted, or random).

The combination of levels 2, 3 and 4 of the spreadsheet interface 1 with selector objects implements the session>block>trial hierarchy of a typical psychological experiment. The hierarchy is implemented in that the experiment starts at the session level 2 of the interface 1. The row indicates the events at the session level 2 including a set of possible independent variables, a "Hello" slide to orient the subject, then the Block Selector 9 that links to the blocks of block level 3. The block level 3 represents the second level of the hierarchy. The block level 3 has variables in the "Block Instructions" slide and the Trial Selector 10. The Trial Selector 10 links to the next level of the hierarchy which is the Trial level 4.

The HES interface 1 illustrates the three levels of the experiment in a concise, simultaneously viewable manner allowing a complete hierarchal view of the full representation of many experiments in a single page. The levels of the experiment, specifications of the variables and properties are viable to communicate the structure and specification of the experiment.

FIG. 2 shows the individual trial specifications of the trial level 4 for a given experiment. It includes variable objects 11 that specifies the independent variables of the trial (that which is being manipulated to assess the effect of the manipulation e.g., difficulty of a math problem). In the illustrated example the variable object is "Congruency" with the individual trial specifications being either "Congruent" or "Incongruent". Each trial specification includes slide objects to present a Fixation 12 (e.g., a "+" showing the subject where to focus their eyes), a slide object to present the Probe stimulus 13 that the subject responds to, and a Feedback object 14 reporting the response accuracy to the subject. The header columns of the different object types have distinguishing colors (e.g., variables tan, slides blue, feedback purple) or optional icons to show the object types. An example of a psychological experiment would be a classic Stroop (1935) experiment using the picture Stroop variant (Toma & Tsao, 1985) assessing how fast one can categorize a picture where there is an incompatible word written on top of it (e.g., a picture of a horse with the word "pie" written over the picture). This assesses how well the picture can be processed with the competing word that elicits an incompatible response. The experiment presents the subjects with many trials; presenting the stimulus and collecting the motor response with millisecond timing precision. The assessment is determining how much the incongruent word slows the subject's response to the picture.

To provide the user categorization of the properties in the spreadsheet format, the properties are organized in categories with a visual indicator (e.g., vertical line separators 15 between each of the experimental objects) and the top cell is a merged cell 11-14 showing the range of the specification plus colors for different object types. Each object has individual properties 16 below the object name. This layout allows context sensitive cuing of help. If the user right clicks the mouse on a cell, a pop-up menu 17 provides options specific to that cell. If the user right clicks on the object level (top row), a menu 18 of object operations is provided. With each click the hint box 8 shown in FIG. 1 changes to summarize options for that cell or heading (note other hint methods might include the use of 'tool tips' or tip text which are displayed automatically when the user hovers the mouse over a particular cell or other features of the interface for a preset amount of time). This allows guiding of the user or experimenter to fill in information correctly. Each cell has formatting controls specific to the property and where appropriate drop down menus for the cell e.g. a Text.ForeColor property drops down a list of commonly used color names.

Figure 3:
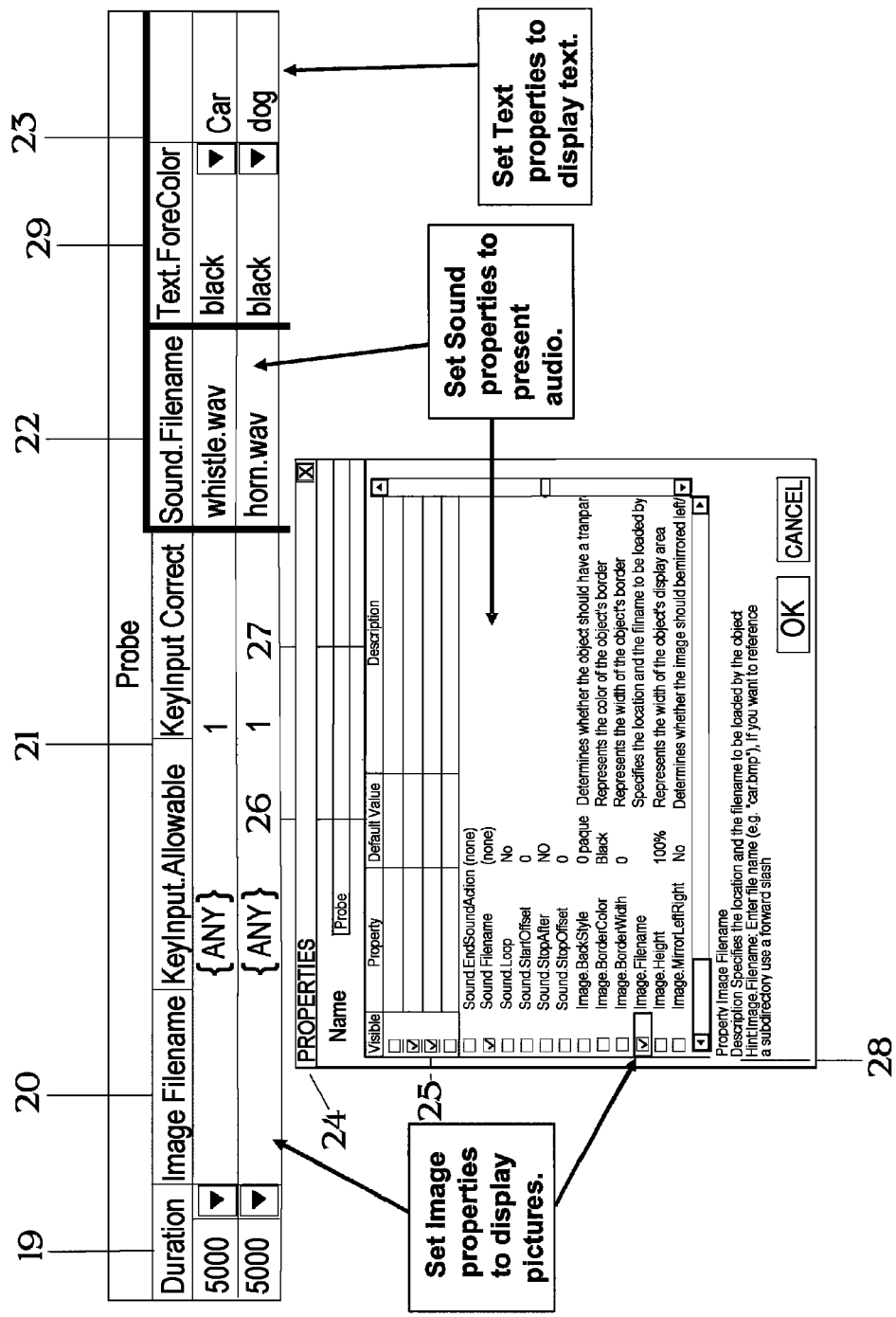
FIG. 3 is a schematic illustration of the display properties of the slide display with sub-objects outlined and the pop-up properties browser used to add properties to the object specification.
Figure 4:
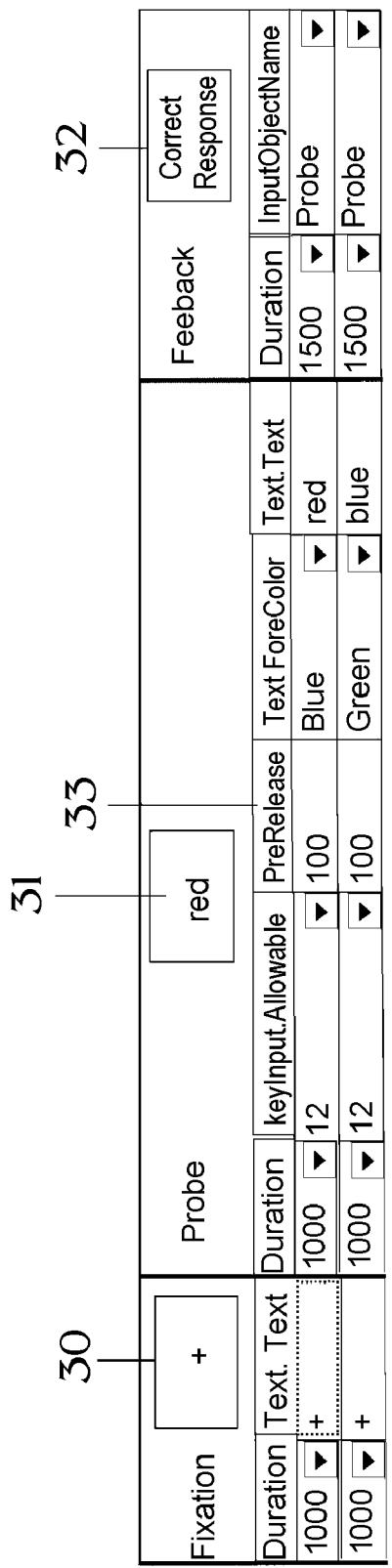
FIG. 4 is a schematic view of a subject display for providing a graphic representation of the objects that the subject will see when the experiment is executed and for providing a summary of what events would occur on each trial.

FIG. 3 schematically shows the properties for a slide object designated in the probe stimulus 13. The properties are organized by the property categories for the experimental object such as the duration 19 of the slide in milliseconds, image properties 20 such as the filename of the bitmap, input properties 21 such as the allowable and correct keys, sound properties 22 such as the filename of a wave file, and text properties 23 determining what the subject sees. Each set of properties are provided with an optional highlighting (e.g. coloring the boarder or icons) to help organize the properties for the user. A double click or right click on the object header brings up the property selector page 24. The property selector page 24 provides a table representation of all of the possible properties for the object. In the object one can hide/expose properties 25. This helps clean up the spreadsheet to simplify data entry and reviewing. One can also set property defaults 26 and view a short 27 and long 28 description of the property. The Text.ForeColor 29 is an example property that could be added, hidden, or modified. It has a drop down menu, not shown, to allow easy color selection. FIG. 4 shows a trial level 4 with "iconified" display views of what the subject would see for a fixation slide display 30 (e.g. look at the + to focus your eyes), probe slide display 31 and feedback display 32.

The HES interface 1 will then take the specification as illustrated in FIG. 1 and convert it into a hierarchical data structure such as an XML file, and then pass that file to an experiment running program that presents the identified stimuli to the subject in the defined manner and collects the response. A key feature of the present invention is that the program performs hierarchy specific insertions of columns and automatic updating of data in related tables. For example, if a user were to add a property to the slide object, such as the Text.ForeColor 29 shown in FIG. 3, the HES interface 1 would automatically a) insert a column for Text.ForeColor 29 for the slide object, b) fill in the default value of all of the cells, and c) expand the object heading row to include the new property. If one clicks on a property heading and hides a column (e.g., Text.ForeColor 29) the spreadsheet removes the column and contracts the slide header row so the object is correctly aligned. In the HES interface 1, the user cannot mismatch the properties to row headers (as would be possible in a traditional spreadsheet). Automatic hierarchical heading control is important since heading alignment errors seriously confuse the user and result in invalid experiments.

The HES interface 1 allows easy hiding/making visible properties. The default approach is to set expected/reasonable default values for all properties and hide nearly all but the most basic properties. For example for a slide display there are over 120 properties, but all have defaults, and only the most critical are made visible (e.g., duration, allowed keys, and text to display). This produces concise spreadsheets, typically allowing the full specification of an experiment in a single page of printout. The user can also collapse an object to a single column to simplify the spreadsheet display.

The preferred implementation of the system is separate, but related sections of an interface display. In other words, a spreadsheet where each section represents a specific hierarchal level of an experiment (session, block, trial). The session level 2 is represented by a single spreadsheet. The next level down in the hierarchy is the block level 3. Experiments typically consist of multiple block types so a graphical collection construct, such as a set of tabbed pages, are used to represent each block type in block level 3 required for a specific experiment. Each tabbed page ('block tab 5') in turn contains a single spreadsheet structure to represent experimental events that occur at the block level 3, and below it a single spreadsheet structure to represent the experimental events that occur at the trial level 4.

The spreadsheets at each level 2, 3 and 4 exist as self contained data structures but links to related spreadsheets are introduced to enforce the hierarchal structure of the experiment, e.g. a trial level 4 has a link up to the block level 3 which governs its behavior and in turn, that block level 3 has a link to the block tab on which it resides, which in turn maintains a link to the session level 2 spreadsheet at the highest level. Additional data structures and object classes are bound to the spreadsheet data structure to enforce further order and structure upon the default columns and rows of the sheet. This construction is in contrast to traditional spreadsheets in which all rows and columns are always present. The HES interface 1 does not create or display new spreadsheet rows until they are required in the experiment. Likewise additional columns in the spreadsheet are not created or shown until new experimental objects (and their associated properties) are added to the spreadsheet. Within an HES interface 1 the left to right order of objects represent the order in which these objects are executed within a running experiment. Linked lists and ordered collection data structures are used to maintain the object order represented by the interface, e.g. when the user clicks on a header row representing a named object and chooses the 'Move Object Left' command, the objects in the ordered collection are reordered (bringing along all their associated properties/columns). The graphical representation of the HES interface 1 is then re-rendered to show the order of the objects and their properties, each of which is represented within a unique column.

Data structures exist which represent each experimental object and its set of unique properties. Likewise data structures exist which represent characteristics of each individual property (e.g. name, data type, default value, min/max value, an optional list of commonly used values, etc). When an object property is selected to be shown in the interface 1, the property is flagged as 'visible' and the property is assigned a new specific column within the spreadsheet. The object's header cell is then expanded to include the new column underneath it. The hierarchical nature of the experiment is pervasive within the implementation of the interface 1 and extends down to the level of the individual cells within each sheet. For instance, cell values within a HES interface 1 may contain named references to other cells. Unique to this implementation is the methodology whereby cell references that cannot be resolved within the spreadsheet at the current level are filtered up the hierarchy to the linked sheet at the next level until the reference is resolved. If the search up the hierarchy reaches the highest (session) level and the cell reference is still not resolved, an error is issued to the user indicating that an invalid reference was made.

A similar hierarchical construct and search methodology is used to specify default property values. For example, an object property may be assigned a specific value or may inherit a local default. That local default value may in turn inherit its value from the next level above in the hierarchy. This implementation allows a user to make a global change within the experiment specification by changing a default property value at the highest level and have it be reflected/inherited in all cells at lower levels of the hierarchy. One of the important properties in the HES interface 1 is the property of pre-release 33 shown in FIG. 4. This specifies the number of milliseconds before the critical event is supposed to take place when the stimulus is prepared and queued for later execution using the Time Event Queue Manager (TEQM) according to the present invention. With a default of 100 ms, each stimulus is prepared 100 ms before it must be displayed and sent to the TEQM for presentation at the specified time in the future. Timing glitches or instabilities in the host computer that are less than the pre-release time will not affect what the subject experiences. For example, assume that preparing the display requires 5 ms and the host operating system causes a delay of 50 ms in the time between the intention to prepare the stimulus and when it is needed. Assume the time of the intended time is the Target Onset Time. For illustration assume the start time is 1000 ms into the experiment. At the Target Onset Time minus pre-release time (i.e. time 900 ms) the host computer prepares the display (assume this is completed in 20 ms the host computer transmits the display to the TEQM). Assume at time 970 ms the operating system blocks the program for 50 ms. However the TEQM hardware would still present the stimulus at 1000 ms. At 1020 ms the experimental program could return to assess the timing of inputs from the subject that were recorded with millisecond accuracy while the host computer was not processing experiment input. For illustration assume a response occurred at 1015 ms. The TEQM would timestamp that response and queue it for transmission to the host PC when it returns to processing the experimental task. The host computer would know the stimulus occurred at 1000 ms and the response at 1015 ms allowing the accurate presentation of the stimulus and recording of the response delay (e.g., 15 ms) even though the host computer was not processing the experimental program during that time (i.e. the 50 ms blockage of the program on the host computer).

Figure 5:
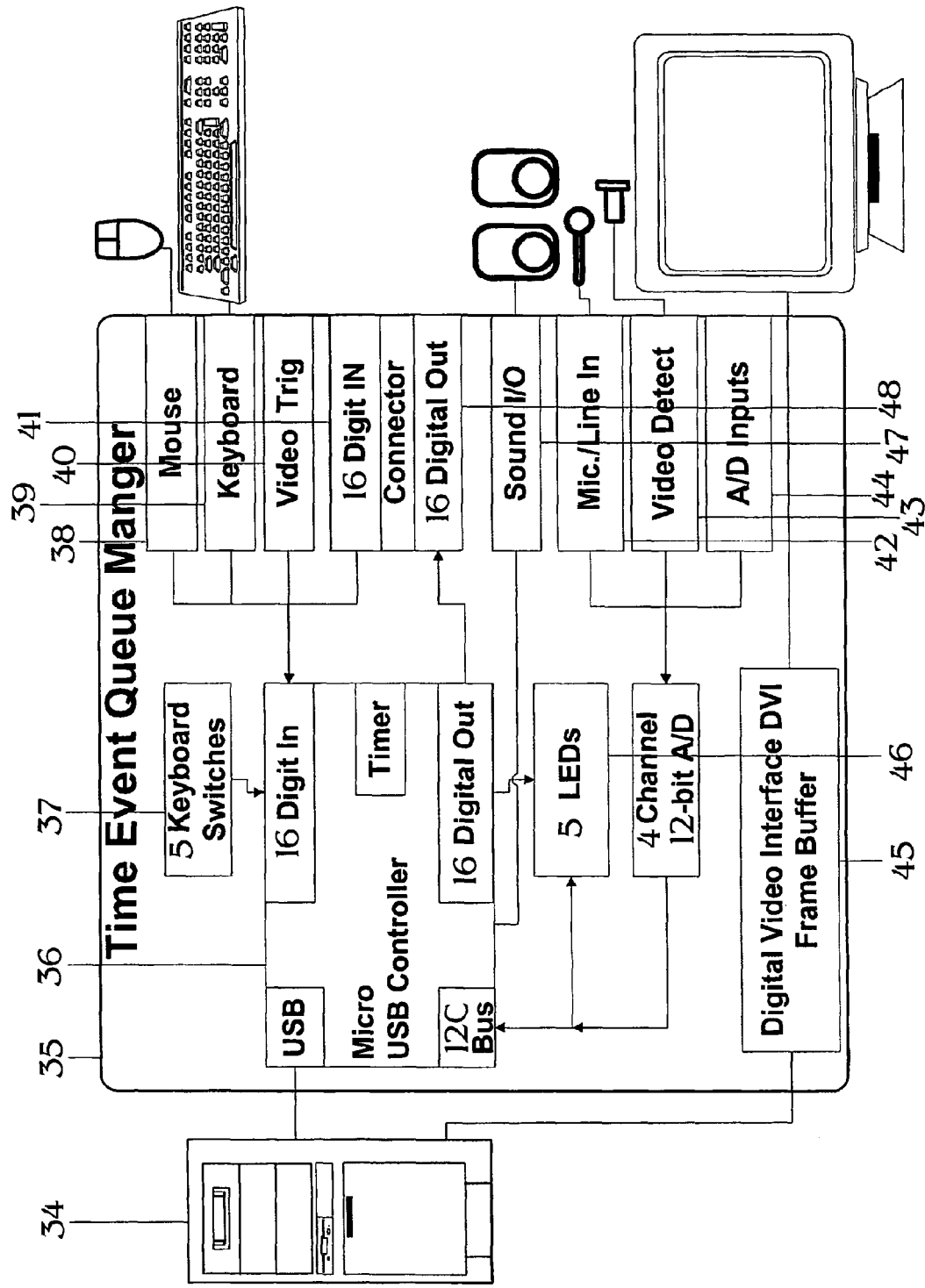
FIG. 5 is a schematic diagram of a Time Queue Event Manager Microprocessor (TEQM) according to the present invention, showing the hardware for queuing, releasing, and time stamping events according to the present invention.

FIG. 5 provides a diagram of the Time Event Queue Manager (TEQM) 35 microcomputer that provides hardware and software to synchronize clocks, track timing, present stimuli at Target Onset Times, and time stamp all input/output actions and events. The host desktop PC 34 connects to the TEQM 35. The preferred implementation of the TEQM 35 would involve a single chip microcomputer 36 including a variety of components such as a USB connection to communicate with the host computer 34, digital inputs 41 and outputs 48, an I2C bus for additional analogue and digital 10, and a sub-microsecond crystal clock. The microprocessor 36 would track and time stamp all subject inputs such as key switches 37, mouse 38, keyboard 39, video trigger input 40 (from the vertical sync pulse on an VGA type display device), digital input devices 41, a microphone for a voice key or analogue trigger 42, video detect signal from a photo-sensor to detect brightening of the display 43 and analogue inputs such as EKG and GSR 44. For DVI video systems there would be a DVI frame buffer 45 such that the system could capture and hold frames for later release. Other outputs include LED output lights 46, digital audio/sound 47 and digital output bits 48 plus additional outputs through expansion on the I2C bus.

Figure 6:
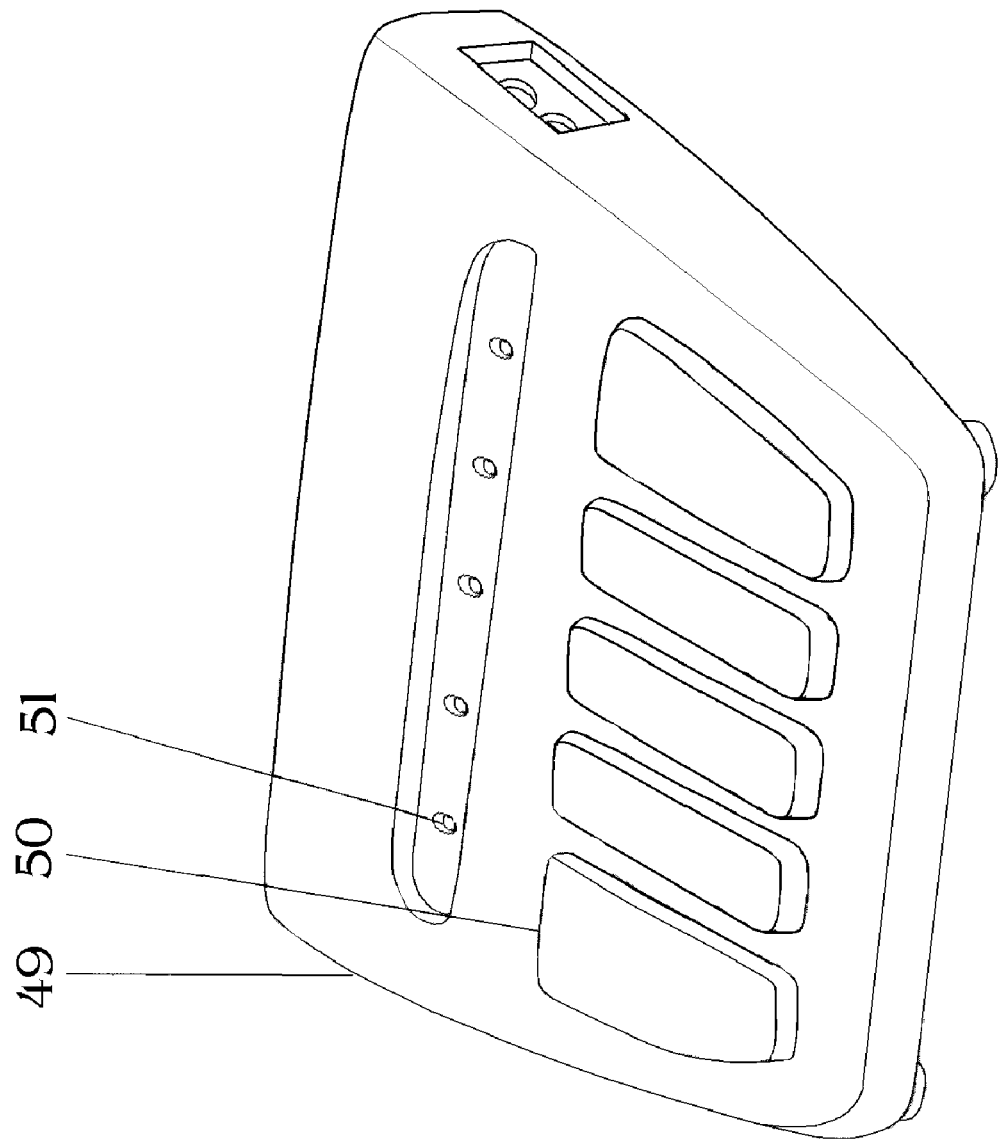
FIG. 6 is a perspective view of a TEQM response device with buttons and LED indicator lights.

FIG. 6 is a perspective view of a sample of the response box device 49 that may be used in conducting the experiments created with the HES interface 1 and utilizing the TEQM 35 according to the present invention. The device is a small response box with easy to see LEDs 50 and large buttons 51 with good tactile feedback and fast response.

The TEQM 35 according to the present invention solves five critical challenges to provide precision timing on a PC computer 34 with poor real-time performance. PCs, such as PC 34, can be very fast but the timing is erratic with occasional serious time glitches typically involving tens of milliseconds (see Schneider et. al., 2002 Chapter 3). The first challenge is having an external independent microprocessor, such as microprocessor 36, that provides time stamping and event output queuing of events between the subject and host computer 34. In the TEQM 35 there is a standalone microprocessor 36 with its own crystal clock. The TEQM 35 system is deterministic and uses tightly coded polling of events, allowing the microprocessor 36 to maintain accuracy and precision of time stamping and time scheduling in the microsecond range. Time stamping involves recording the time of all subject related input and output events with microsecond accuracy. The TEQM 35 computer timing is independent of and uninfluenced by loading problems of the PC 34 and can therefore provide reliable timing.

The second challenge involves maintaining precision of output that is initiated by the host computer 34 even when the host computer 34 experiences erratic timing events. This is solved by having the host PC 34 pre-release the output events to TEQM 35 early enough that glitches in the host computing timing will not affect subject related output timing. This is accomplished by having the control program pre-generate stimuli, download them to the TEQM 35 and have the TEQM 35 schedule the event based on its independent clock and not the clock of the host computer 34. This is done by having the experiment generator software pre-release execution to the next stimulus event before it must occur and having the TEQM 35 hold the prepared event until the scheduled Target Onset Time of the event. The event output queuing involves the host computer 34 sending the TEQM 35 the Target Onset Time of an intended event (sound, lights, video image). The TEQM 35 buffers the data for the output stimulus and enters the event in a real time queue for execution at the specified time. For digital I/O events, sound files and digital streams at modest speeds (under 100 k Hz) the data is buffered in the TEQM memory, using multi-buffered data streams to maintain continuous output that starts at the specified Target Onset Time events. The pre-release concept requires that the clocks be synchronized as discussed below.

The Digital Video Interface (DVI) data involves too high of a data rate (e.g., up to 1.6 Gigabits per second) to be processed through the USB data bus. The DVI data from the host computer 34 is buffered into dedicated memory in a high speed multi-buffering system. For example, the host computer 34 would inform the TEQM 35 to capture the next frame. The TEQM 35 would begin storing the video information in a DVI frame buffer 45 at the next top of screen (vertical blanking) event. Then, at the time of the Target Onset Time, the output circuit of the DVI frame buffer 45 would switch to the new frame displaying the image previously captured. The previous memory buffer would then be available to load the next frame. Using a double buffering scheme the system can display one frame while loading the next image. The input and output buffering can be synchronous or asynchronous. In typical use the output top of screen signal would be linked to the TEQM clock so all display events would be an integer multiple of the clock rate (e.g., run the video system at a 100 Hz output with each display 10 ms at 0, 10, 20, . . . millisecond time points.

In host systems that do not include DVI output devices, either a VGA frame buffer or a predictive refresh procedure can be used. The VGA frame buffer works like the DVI frame buffer except that there is an A/D stage that digitizes reads the analogue Red, Green, Blue lines before they are buffered. The predictive refresh procedure predicts when the display should occur and locks down the host computer close to the time of the change in a video display. This is an augmentation of the pre-release approach. As before, at typically 100 ms before the display is to be presented the information is prepared in the display memory. Then the program reduces the priority of the program to increase the chances that the operating system will take whatever time slices are necessary to maintain the general state of the system. At some time window before the critical display event (e.g., −20 ms preceding the next Target Onset Time, the host experimental computer 34 goes into high priority mode blocking any other threads from getting execution cycles and at the target onset time the new display buffer becomes the output buffer and is output to the video display). In the preferred implementation, events pre-release when the next event is within 100 ms.

In reasonably tuned PCs 34 timing glitches appear infrequently and are generally of short duration (<50 ms) and would therefore not impact timing of TEQM 35 as discussed above.

The third challenge involves monitoring a stand alone clock with sub-millisecond accuracy to release events and time stamp inputs. The TEQM 35 maintains a sorted cue of event times and checks at least every 10 microseconds to determine when to release output events and time stamp those events.

The fourth challenge involves methods to synchronize clocks between the TEQM 35, host PC computer 34, and the display card refresh rate with the precision of microseconds. This problem is particularly serious with USB (Universal Serial Bus) based connections since USB communications occur in frame times in the millisecond range for low speed peripherals and 100 microseconds for high speed peripherals. The solution applies several approaches to get microsecond synchronization with delays of milliseconds for USB transmissions. These approaches required that the host computer 34 to know when a transmission between it and the external microprocessor 36 occurs. This was done by the host program recording the time it was ready to send a USB data packet and the time it was actually sent. This is recorded in units of the host clock time (100 nanoseconds for the Query Performance Counter (QPC) in Windows®). If the time between being ready to transmit and the actual transmission is short (e.g., under 20 micro-seconds) the PC 34 can tell when the TEQM 35 should have received the packet. The host 34 records the time and the uncertainty interval of the transmission. This typically is accurate to within twenty microseconds if there were no other concurrent USB transmissions or other processes operating on the host computer 34 during the time slice that was occurring when the USB transmission was initiated. The TEQM 35 records when the packet transmission begins to be received and sends the host computer 34 an acknowledge packet that includes the time in the TEQM computer 35 when the packet was received.

The system uses a valid transmission event method to determine and synchronize timing. Time precision can be precisely determined after a modest number (e.g., 10) of valid short transmission events. It is better to estimate the time synchronization based on the short time transmission events and then exclude the occasional long transmission events (which involve large time uncertainty) from the calculations. For example, if the transmissions took 15, 18, 12, 21, 14, 3970, 12, 19 microseconds it is best to estimate the time based on the under 20 microsecond events and exclude the long events (over 20 or the 3970 event) from being used in the time estimation procedure. The host computer 34 uses an incremental linear regression formula to predict TEQM 35 time based on host time for valid transmission events. To update the data due to drift in the clocks the host computer 34 would keep a ring buffer of the past valid transmissions (e.g., last 50), calculating a running regression of the TEQM 35 time based on host 34 time. In tests the present system has been able to maintain precision to within 10 microseconds using these methods.

In experimental timing there is a third clock that is active—the video card refresh clock. This clock is typically determined by the clock in the video display card and is a free running clock. This invention provides methods to estimate the video refresh clock time. The TEQM 35 will time stamp the top of screen (vertical blanking) event of the video card. The TEQM 35 will send the time stamps to the host computer 34 (e.g., one packet after ten top of screen synch pulses are detected). The host computer 34 will also estimate the time uncertainty of the top of screen event of the video card (i.e., estimate the time before and after the top of screen event). Using the valid transmission event algorithms developed for USB based synchronization, the host 34 can time stamp the video output and relate that to the TEQM 35 time stamping of the video top of screen event using a running linear regression method. Using these methods the three clock times can be interrelated with typically 10 microsecond precision. Equations allow synchronizing and predicting the time of each the two other clocks based on the time of any one of the clocks. The clocks can also be rescaled to make them exact time multiples of any one clock.

A typical example of rescaling would involve aligning all the time events to the video refresh clock. For example assume that the display card is operating at 69.9994 Hz (which is 0.999991429 of a perfect 70 Hz monitor) and the host computer 34 has a value of 1.00002 ms per millisecond tic. Assume the experiment displayed a stimulus for a duration equivalent to 7000 refreshes. That would be 100.000857 seconds involving 99998.857 tics. If the host computer 34 is rescaled by multiplying it's timestamps by 0.999971429, the clocks are rescaled such that each 7 refreshes will produce exactly 100 clock tics. This rescaling allows the experimenter to operate on the assumption that clock events and refresh events being exactly synchronized, eliminating time aliasing that occurs if the clocks are not aligned and rescaled. For example without these procedures, some display durations might be 7 refreshes some 6, some 8 causing errors of 20% in timing. With rescaling, all display durations would be 7 refreshes and take 99.9991429 milliseconds. The typical experimenter would round the time to 100 ms for reporting purposes. Note all these calculations are performed on the host computer 34 using double precision floating point calculations with 15 digits of precision calculations.

The fifth challenge is to provide an audit of timing precision of all events going to the subject. This is done by relating the target onset time to the TEQM 35 time to determine the timing error. Since the TEQM 35 is the most reliable clock in the system it will be used for the reference time. Whenever the TEQM 35 outputs an event it records the time of the event relative to the Target Onset Time at the microsecond level. Whenever the TEQM 35 records an event it estimates how long since it last polled the event or how long an interrupt took before it was serviced. This provides an assessment of timing errors on output (Target Onset Time-actual TEQM time of event) and input (duration to timestamp of the input) timing. This information is transferred from the TEQM 35 to the host computer 34 to estimate the timing precision. In general, the host computer 34 would have a threshold of "accurate timing precision" (e.g., if the output time or the input uncertainty was less than 0.1 ms it is negligible and should be ignored). When the time error/uncertainty is above threshold the experimenter is notified so the data might be processed excluding any problematic time events or so the system might be tuned to reduce timing errors.

It will be apparent to those of ordinary skill in the art that various changes and additions may be made to the present invention without departing from the spirit and scope of the present invention. For example, the system may include dynamic representations of the subject's view, i.e. showing the screens of a full trial at design time. Further the system may utilize the structure of the experiment to infer and automatically prepare the primary analysis that user wants potentially further minimizing experiment specification errors, e.g. many costly errors result from the experimenter not being able to take the time to perform a detailed examination of the data logged until after many subjects are collected. If researchers could just press a button to create their analysis they would likely look at it sooner before it's too late. A further addition to the present system is to include the 'accelerated auto answer' mode that prior art systems, such as MEL had. This would be a big advantage in a classroom setting as even though users build the experiment quickly using HES, they must run it over and over again to check for coding errors in the data. As many of these student level experiments will be memory &-recall paradigms, a typical test run could be 15+ minutes of lab time. If they then identify a mistake it would be another 15+ minutes to run again in order to verify the mistake was fixed. Consequently the accelerated auto answer could be of great assistance in such setups. The above representations of the present invention are intended to be illustrative of the present invention and not restrictive thereof. The scope of the present invention is defined by the appended claims and equivalents thereto.

What is claimed is:

1. An experiment generator for developing psychological experiments with each experiment composed of a number of trials, wherein each trial involves several experimental objects/operators and a collection of responses, wherein the trials are grouped in blocks and sets of blocks make up a session for each experiment being generated, the experiment generator comprising:
   a first computer database spreadsheet associated with the session for the experiment being generated;
   a second computer database spreadsheet associated with the blocks for the experiment being generated, the second computer database spreadsheet being subordinate to and interconnected with the first computer database spreadsheet;
   a third computer database spreadsheet being associated with the trials of the experiment being generated, the third computer database spreadsheet being subordinate to and interconnected with the second computer database spreadsheet, whereby three dependent, interconnected, hierarchal spreadsheets are provided in the experiment generator;
   and a time event queue manager for running the experiment being generated by a computer processor, wherein the time event queue manager will synchronize clocks, track timing, present stimuli at target onset times, and time stamp all input output actions and events.

2. The experiment generator according to claim 1 wherein the three spreadsheets are displayed to the user simultaneously.

3. The experiment generator according to claim 2 wherein the spreadsheets include headings and the dependent spreadsheets include hierarchal heading control.

4. The experiment generator of claim 1 wherein the experiment is run on a host computer and the time event queue manager uses a pre-release event time synchronization system having
   a. An external dedicated microprocessor providing time stamping and event output queuing between the subject and the host computer;
   b. A pre-release mechanism for having the host computer pre-release the outputs to the system;
   c. An independent real time monitor for release events in real time and for time stamping input data;
   d. A clock synchronizer to synchronize clocks at least between the system and the host computer;
   e. And a time recording mechanism for maintaining a record of the timing precision of all events presented to or observed by a subject.

5. The experiment generator of claim 4 wherein time monitor of the time event queue manager has sub-millisecond accuracy.

6. A time event queue manager for running a psychological experiment, wherein the experiment is run on a host computer and the time event queue manager uses a pre-release event time synchronization system having
   a. An external dedicated microprocessor providing time stamping and event output queuing between the subject and the host computer;
   b. A pre-release mechanism for having the host computer pre-release the outputs to the system;
   c. An independent real time monitor for release events in real time and for time stamping input data;
   d. A clock synchronizer to synchronize clocks at least between the system and the host computer;
   e. And a time recording mechanism for maintaining a record of the timing precision of all events presented to or observed by a subject.

7. The time event queue manager of claim 6 wherein time monitor of the time event queue manager has sub-millisecond accuracy.

8. A method for developing psychological experiments with each experiment composed of a number of trials, wherein each trial involves several experimental objects/operators and a collection of responses, wherein the trials are grouped in blocks and sets of blocks make up a session for each experiment being generated, the method comprising the steps of:
   providing an experiment generator having three dependent, interconnected, hierarchal computer database spreadsheets, one of the spreadsheets associated with the session for the experiment being generated, one of the spreadsheets associated with the blocks for the experiment being generated, and one of the spreadsheets being associated with the trials of the experiment being generated;
   using the computer database spreadsheets of the experiment generator to develop and modify at least one psychological experiment;
   and running an experiment generated with a time event queue manager by a computer processor, wherein the time event queue manager will synchronize clocks, track timing, present stimuli at target onset times, and time stamp all input output actions and events.

9. The method according to claim 8 further comprising the step of simultaneously displaying the three spreadsheets to the user.

10. The method according to claim 9 wherein the spreadsheets include headings and the dependent spreadsheets include hierarchal heading control.

11. The method of claim 8 wherein the experiment is run on a host computer and the time event queue manager uses a pre-release event time synchronization system having
   a. An external dedicated microprocessor providing time stamping and event output queuing between the subject and the host computer;
   b. A pre-release mechanism for having the host computer pre-release the outputs to the system;
   c. An independent real time monitor for release events in real time and for time stamping input data;
   d. A clock synchronizer to synchronize clocks at least between the system and the host computer;
   e. And a time recording mechanism for maintaining a record of the timing precision of all events presented to or observed by a subject.

12. The method of claim 11 wherein time monitor of the time event queue manager has sub-millisecond accuracy.

* * * * *